United States Patent [19]

Tsuchida et al.

[11] 4,227,701
[45] Oct. 14, 1980

[54] RUPTURABLE SEALING STRUCTURE OF CELL

[75] Inventors: Takashi Tsuchida, Kosai; Kenichi Shinoda, Toyohashi; Takao Takase, Arai, all of Japan

[73] Assignee: Fuji Electrochemical Co., Ltd., Tokyo, Japan

[21] Appl. No.: 761

[22] Filed: Jan. 2, 1979

[51] Int. Cl.³ .......................... H01M 2/12; F16J 15/00
[52] U.S. Cl. ........................................ 277/12; 277/29; 429/185; 429/56; 429/53
[58] Field of Search ...................... 429/53, 56, 54, 185; 277/12, 29, 29Y R, 212 C, 181

[56] References Cited

U.S. PATENT DOCUMENTS

| | | | |
|---|---|---|---|
| 2,922,833 | 1/1960 | Philipp | 429/56 |
| 3,218,197 | 11/1965 | Carmichael et al. | 429/185 X |
| 3,219,488 | 11/1965 | Southworth | 429/185 X |
| 3,314,824 | 4/1967 | Spanur | 429/185 X |
| 3,338,750 | 8/1967 | Urry | 429/53 |
| 3,787,243 | 1/1974 | Zaleski | 429/56 |

Primary Examiner—Robert S. Ward, Jr.
Attorney, Agent, or Firm—Wenderoth, Lind & Ponack

[57] ABSTRACT

A sealing gasket of a cell comprises a circumferential marginal portion constricted between a metal casing and a terminal plate, a center collar through which a collector metal rod penetrates, and an intermediate portion integrally molded with the marginal portion and the center collar and having a thin wall portion tearable by a stretching force applied thereto. The center collar of the gasket is normally separated from the terminal plate but is movable toward the terminal plate by sliding on the collector metal rod in the event that the internal gas pressure within the cell is abnormally developed, whereby the thin wall portion of the gasket is stretched and torn to release the gas.

6 Claims, 4 Drawing Figures

RUPTURABLE SEALING STRUCTURE OF CELL

BACKGROUND OF THE INVENTION

This invention relates to a rupturable sealing structure of a cell which normally prevents electrolyte from leaking therethrough but which allows a gas abnormally developed in the cell to be released therefrom by rupture of a sealing gasket.

It is known to provide a rupturable sealing gasket in a cell. The gasket normally has a thin part which can be expanded outwardly by an abnormal gas pressure developed in the cell and finally ruptured by the increase of the gas pressure. However, it has been very difficult to integrally form or mold the thin part in the gasket such that the thin part can be ruptured without fail when the internal gas pressure is developed upto a certain critical value.

Accordingly, another proposal has been made as shown in U.S. Pat. No. 3,314,824 in which a sharp member is provided in the cell adjacent to a gasket to puncture the latter when the internal gas pressure is abnormally increased in the cell. This proposed structure, however, requires the additional sharp member which causes not only the reduction of the effective internal volume of the cell but also the increase of the production costs of the cell.

SUMMARY OF THE INVENTION

An object of the present invention is, therefore, to provide a rupturable sealing structure of a cell wherein a sealing gasket used therein has a thin part rupturable without fail by a predetermined value of the internal gas pressure in the cell.

Another object of the present invention is to provide a rupturable sealing structure of a cell wherein a sealing gasket used therein can effectively prevent electrolyte from leaking therethrough but can be ruptured by abnormally developed internal gas pressure in the cell without the aid of a sharp member.

According to the present invention, a rupturable sealing structure of a cell is provided which comprises a sealing gasket having a circumferential marginal portion constricted between a free end of a metal casing and a peripheral edge of a terminal plate, a center collar through which a collector metal rod penetrates, and an intermediate portion integrally molded with the marginal portion and the center collar. The intermediate portion of the gasket has a thin wall portion. The center collar of the gasket is normally separated from the terminal plate but is movable toward the terminal plate by sliding on the collector metal rod in the event that the internal gas pressure within the cell is abnormally developed, whereby the thin wall portion of the gasket is stretched and torn to release the gas.

Preferably, the sealing gasket also has an annular flexible wall contacting at the free end thereof the terminal plate to define a closed space about the metal collector rod portion between the center collar of the gasket and the terminal plate. The closed space contains therein a mixture of semi-solid adhesive material and acid material.

In a preferable sealing structure, the marginal portion of the gasket is constricted by a curled free end of the metal casing against the peripheral edge of the terminal plate. The metal casing is covered with an insulative tube on the side wall as well as the curled free end thereof. A metal jacket is provided outside the insulative tube, the free end of the jacket being curled and constricting an annular packing against the free end of the metal casing.

Other objects and features of the present invention will become apparent from the following detailed description of preferred embodiments thereof when taken in conjunction with the accompanying drawings, in which:

DETAILED DESCRIPTION OF THE PREFERRED EMBODIMENTS

Figure 1:
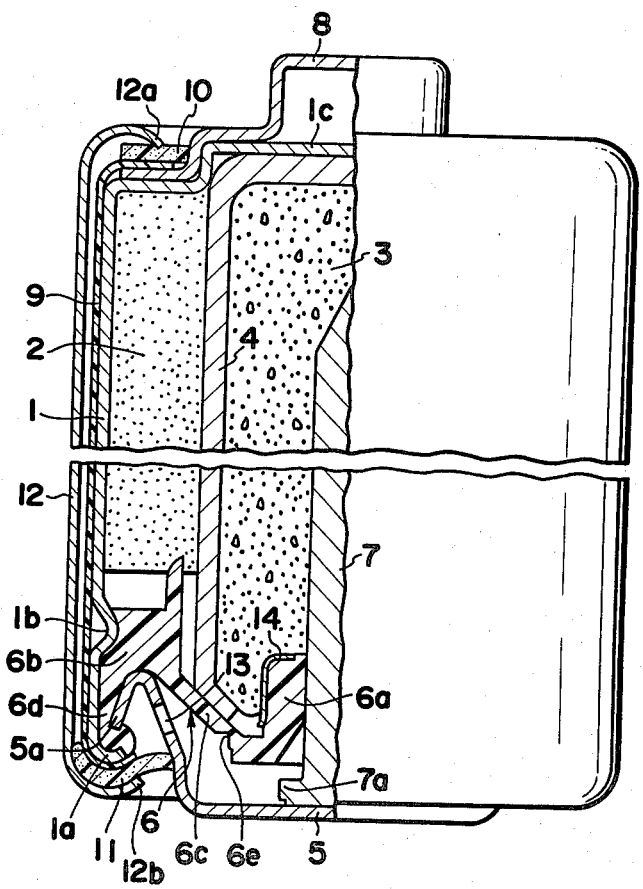
FIG. 1 is a front view of a cell according to a first embodiment of the present invention, with half thereof sectioned.
Figure 2:
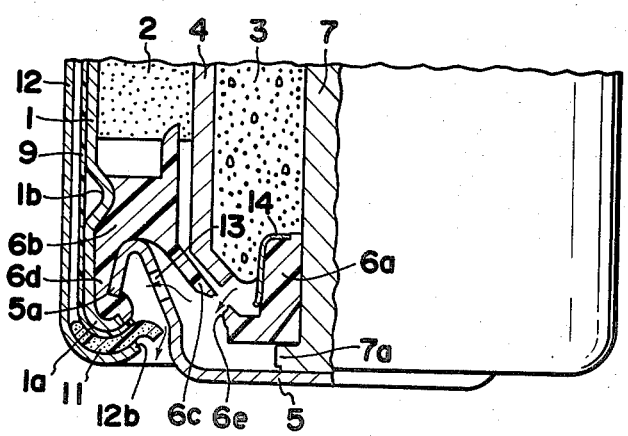
FIG. 2 is a partially sectioned front view of the cell having a sealing gasket ruptured to release gas in the cell.

Referring to a first embodiment of the present invention shown in FIG. 1 and FIG. 2, a cup-shaped metal casing 1 contains therein a cathode composition 2 and an anode composition 3 with a separator 4 therebetween. The metal casing 1 has a curled free end 1a closed by an anode terminal plate 5 and a sealing gasket 6. The terminal plate 5 has a collector metal rod 7 spot-welded to the inner center thereof. The sealing gasket 6 has an annular center collar portion 6a, through which the collector metal rod 7 penetrates, a circumferential marginal portion 6b, and an intermediate bevelled portion 6c integrally molded with the center collar portion 6a and the marginal portion 6b. The first sealing of the cell is made by constricting the marginal portion 6b of the gasket 6 by the free end of the metal casing 1 against the peripheral edge of the terminal plate 5.

It is preferable in this first sealing portion that the marginal portion 6b of the gasket 6 be constricted not only in the radial direction but also in the axial direction of the cell and further that the stronger constricting force be applied by the free end of the metal casing 1. To this end, the anode terminal plate 5 of the present invention is made of a firm metallic material such as a spring steel plate or a stainless steel plate and has a relatively deep dish-shape with the peripheral edge thereof being folded outwardly to form an annular free flange 5a. The constricting force applied to the gasket 6 by the curled free end 1a of the metal casing in received by such a small end surface at the peripheral edge of the terminal plate 5, thereby increasing the sealing force. To receive such a high constricting force, the metal casing 1 is inwardly recessed at the side surface portion 1b thereof, which is partially pressed into the marginal portion 6b of the gasket 6. It is important at this first sealing portion that the curled free end of the metal casing 1 extends inwardly in the radial direction beyond the peripheral edge of the terminal plate 5, whereby the curled constricting force of the metal casing is effectively transmitted to the peripheral edge of the terminal plate 5 through the gasket 6. Preferably, the annular free flange 5a of the terminal plate 5 is folded in the shape of an inverted "V" or "U" at the position shown in FIG. 1, whereby the compression force applied to the vertical marginal portion 6d of the gasket by the vertical side wall of the metal casing is gradually increased toward the free end of the terminal plate 6.

After forming the first sealing portion, as set forth above, a cathode terminal cap 8 is placed upon the closed end of the metal casing 1. The peripheral edge of the terminal cap 8 as well as the side wall of the metal casing 1 is covered with an insulative tube 9 made of paper or thermo-shrinkable polyvinyl chloride. Preferably, the closed end of the metal casing is expanded outwardly to form an end projection 1c upon which the terminal cap 8 snugly engages. By the end projection 1c thus formed, it becomes very easy to place the terminal cap 8 at the center of the closed end of the metal casing 1 in the manufacturing process of the present cell and also the internal volume of the cell can be increased to contain a larger amount of the active anode composition 3.

Placed upon both ends of the insulative tube 9 are annular packings 10 and 11 which are then constricted by opposite curled ends 12a and 12b of an outer metal jacket 12, whereby the second sealing portion of the cell is provided at the curled end of the jacket 12.

The second sealing portion of the cell is arranged to lap the first sealing portion in such a manner that the lower free end of the insulative tube 9 is extended radially inwardly beyond the free end 1a of the metal casing 1, as shown in FIG. 1. Likewise, the lower free end 12b of the metal jacket 12 is extended radially inwardly beyond the free end 1a of the metal casing 1.

The annular packing 11 compressed between the curled free ends 1a and 12b of the metal casing 1 and the jacket 12, respectively, is made of a relatively soft material. Preferably, the annular inner end of the packing 11 is resiliently pressed against the side wall of the dish-shaped terminal plate 5. The side wall of the terminal plate 5 is provided with a vent hole 13 axially inside of the packing 11, the function of which shall be described hereinafter in detail.

The double sealing structure of the present invention, in which the second sealing portion laps the first sealing portion, makes it possible to completely seal the electrolyte in the cell and to prevent leakage of the electrolyte from the cell without reducing the internal volume of the cell.

Referring to a rupturable structure of the sealing gasket 6 of the first embodiment shown in FIGS. 1 and 2, the intermediate bevelled portion 6c of the gasket has a wall thickness much thinner than the collar portion 6a and the marginal portion 6b. The bevelled portion 6c of the gasket has an annular groove 6e at the outer surface thereof, so that the thickness of the gasket 6 at the annular grooved portion can be thin enough to be torn when stretched in the axial direction. According to the present invention, the center collar portion 6a of the gasket 6 is made to be slidable upon the collector metal rod 7 toward the anode terminal plate 5 when the internal gas pressure of the cell is abnormally developed. To this end, in the embodiment shown in FIG. 1, a free space is provided between the outer surface of the collar portion 6a and the inner welded head portion 7a of the rod 7.

According to such a structure shown in FIG. 1, when the internal gas pressure of the cell is abnormally developed therein, the center collar portion 6a of the gasket 6 is urged toward the anode terminal plate 5 by the gas pressure and, thereby, slides on the collector metal rod 7 toward the terminal plate 5 by stretching the grooved annular thin wall portion 6e of the gasket. Therefore, the thin wall portion 6e of the gasket is torn and ruptured and the gas in the cell is released through the vent hole 13 in the terminal plate. The gas released through the vent hole 13 still has a high pressure sufficient to deform the free end of the packing 11 outwardly, so that the gas is released outside of the cell as shown by arrows in FIG. 2.

The rupturable sealing structure of the present invention is very advantageous since the gas pressure developed in the cell can be converted to the tearing force of the gasket. Also, a relatively high tearing force can be obtained by a relatively long sliding movement of the center collar portion 6a of the gasket. In addition, the tearing force is concentrated at the grooved annular thin wall portion 6e of the gasket, so that the critical thickness of the thin wall portion 6e of the gasket to be ruptured at a predetermined value of the gas pressure can be relatively large. This means that the present invention can eliminate the conventional problems caused by difficulties in making a part of the gasket thin below a certain low critical value.

In the preferred embodiment of the present invention, the center collar portion 6a of the gasket 6 is radially constricted against the collector metal rod 7 by an annular cap 14 so as to prevent the creep of the electrolyte along the rod 7. However, it is impossible in practice to completely prevent such creep of the electrolyte by the constriction of the annular cap 14.

Figure 3:
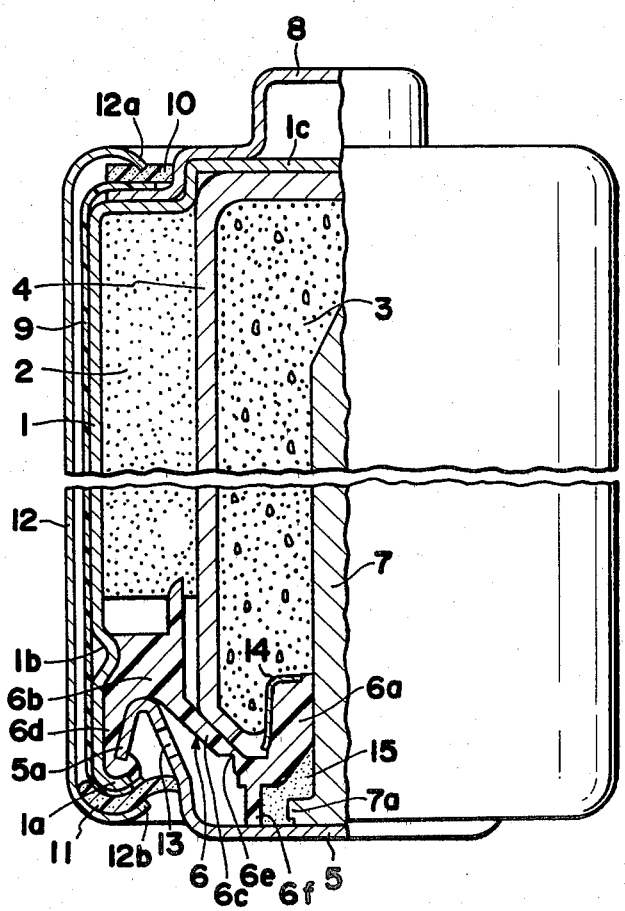
FIG. 3 is a front view of a cell according to a second embodiment of the present invention, with half thereof sectioned.
Figure 4:
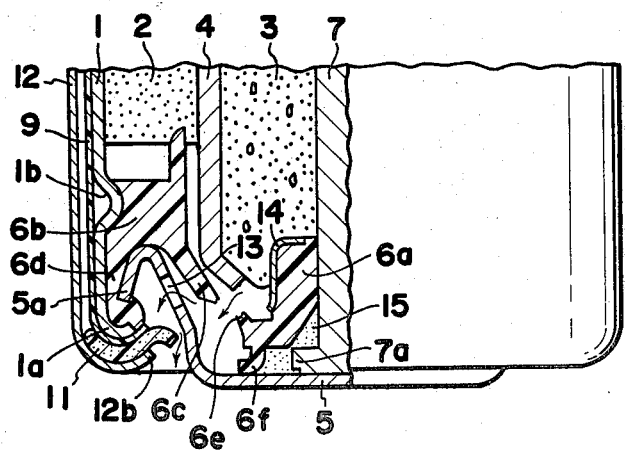
FIG. 4 is a partially sectioned front view of the cell of the second embodiment having a sealing gasket ruptured to release gas in the cell.

Accordingly, in a second embodiment shown in FIGS. 3 and 4, the rupturable sealing gasket 6 is provided with an annular flexible wall 6f integrally molded therewith, which contacts at the free end thereof the anode terminal plate 5 to define a closed space about the metal collector rod 7 between the center collar portion 6a of the gasket and the terminal plate 5. Contained in the closed space in contact with the collector metal rod 7 is a mixture 15 of semi-solid or gelled adhesive material and acid material. The semi-solid material may be an uncured epoxide resin, vaseline, grease, pitch, wax, rubber-type adhesive or silicone resin. The acid material may be an inorganic acid such as boric acid and salicylic acid or an organic acid. To contain the mixture 15 in the closed space in the process of manufacturing the cell, it is preferable first to coat or apply the mixture on the metal rod 7 and then to tightly insert the metal rod 7 into the center collar portion 6a of the gasket 6 from the inner free end of the rod, whereby the mixture on the rod is squeezed therefrom and contained inside of the annular wall 6f. The other structures of the second embodiment are substantially same as those of the first embodiment.

The mixture 15 confined by the annular wall 6f will remain in the closed space even when the fluidity thereof is increased by the elevation of the ambient temperature and will react with any alkaline electrolyte which reaches the closed space by creeping along the metal rod, so that the electrolyte is neutralized by the chemical reaction and does not creep any further.

Since the annular wall 6f of the gasket is flexible, it does not prevent the sliding movement of the center collar portion 6a of the gasket when the internal gas pressure of the cell is abnormally developed. Thus, the gasket 6 of the second embodiment can be ruptured as in the case of the first embodiment and allows the internal gas to be released outside of the cell as shown in FIG. 4.

Although the present invention has been described with reference to preferred embodiments thereof, many modifications and alterations may be made within the spirit of the present invention.

What is claimed is:

1. In an alkaline cell of the type including a metal casing having a free end, a terminal plate at said free end, a collector metal rod extending inwardly from said terminal plate, whereby internal gas pressure is developed within said cell, and a rupturable sealing structure for sealing said cell, the improvement wherein said rupturable sealing structure comprises:

a sealing gasket including a circumferential marginal portion, a center collar portion, and an intermediate portion integrally molded with said marginal portion and said collar portion;

said marginal portion being constricted between said free end of said metal casing and a peripheral edge of said terminal plate;

said intermediate portion having a thin wall portion which is tearable upon a stretching force being applied thereto;

said collar portion being slidably mounted around said collector metal rod for axial sliding movement relative thereto;

said collar portion normally being inwardly spaced from said terminal plate, but said collar portion being slidable along said collector metal rod toward said terminal plate upon the development within said cell of abnormally high internal gas pressure, whereby said thin wall portion is stretched and ruptured and the gas is released from within said cell.

2. The improvement claimed in claim 1, wherein said sealing gasket further includes an annular flexible wall contacting at a free end thereof said terminal plate to define a closed space about said metal collector rod between said center collar portion of said gasket and said terminal plate, said closed space containing therein a mixture including acid material.

3. The improvement claimed in claim 2, wherein said mixture additionally contains a semi-solid adhesive material selected from uncured epoxide resin, vaseline, grease, pitch, wax, rubber-type adhesive and silicon resin.

4. The improvement claimed in claims 1 or 2, wherein said thin wall portion of said gasket is provided by forming an annular groove in said intermediate portion of said gasket.

5. The improvement claimed in claims 1 or 2, wherein said free end of said metal casing comprises a curled free end, said metal casing is covered on the side wall thereof and on said curled free end thereof with an insulative tube, said insulative tube is covered with an outer metal jacket, said jacket has a curled free end constricting an annular packing against said curled free end of said metal casing, the inner end of said annular packing resiliently contacts a side wall of said terminal plate, and said terminal plate has a vent hole inside of said annular packing.

6. The improvement claimed in claim 5, wherein said free end of said metal casing extends radially inwardly beyond said peripheral edge of said terminal plate; and said free end of said metal jacket extends radially inwardly beyond said free end of said metal casing.

* * * * *